United States Patent
Rose et al.

(10) Patent No.: US 6,565,202 B2
(45) Date of Patent: May 20, 2003

(54) PIGMENTED AQUEOUS INKS AND INK SET FOR INK JET PRINTING

(75) Inventors: Peter Edward Rose, Winsford (GB); Jason Paul Thom, Northwich (GB); Nicholas Alexander Walker, Holmes Chapel (GB)

(73) Assignee: Ilford Imaging UK Limited (GB)

( * ) Notice: Subject to any disclaimer, the term of this patent is extended or adjusted under 35 U.S.C. 154(b) by 0 days.

(21) Appl. No.: 10/025,250

(22) Filed: Dec. 19, 2001

(65) Prior Publication Data

US 2002/0118265 A1 Aug. 29, 2002

(30) Foreign Application Priority Data

Dec. 23, 2000 (GB) .............................................. 0031644

(51) Int. Cl.[7] .................................................. B41J 2/05
(52) U.S. Cl. ........................ 347/100; 347/96; 106/31.6; 106/31.13
(58) Field of Search ................. 347/100, 96; 106/31.13, 106/31.28, 31.6

(56) References Cited

U.S. PATENT DOCUMENTS

| 5,489,621 | A | * | 2/1996 | Sato et al. ................... 430/293 |
| 5,803,958 | A | * | 9/1998 | Katsen et al. ................ 347/100 |
| 5,835,116 | A | | 11/1998 | Sato et al. |
| 5,965,633 | A | * | 10/1999 | Revol ........................ 106/31.6 |
| 6,040,356 | A | * | 3/2000 | Kanki et al. ................. 523/160 |
| 6,277,184 | B1 | | 8/2001 | Kato |
| 6,306,994 | B1 | * | 10/2001 | Donald et al. ............... 526/318 |
| 6,335,139 | B1 | * | 1/2002 | Gambayashi et al. ......... 430/97 |
| 6,433,117 | B1 | * | 8/2002 | Ma et al. ................. 106/31.13 |

FOREIGN PATENT DOCUMENTS

| EP | 0724968 A1 | 8/1996 |
| EP | 0899311 A1 | 3/1999 |
| EP | 0913438 A1 | 5/1999 |
| EP | 1002839 A1 | 5/2000 |
| JP | 08-113737 | 5/1996 |
| JP | 08-113738 | 5/1996 |
| WO | WO 00/46309 | 8/2000 |

* cited by examiner

Primary Examiner—Hai Pham
Assistant Examiner—Manish S. Shah
(74) Attorney, Agent, or Firm—Onofrio Law; Dara L. Oofrio, Esq.

(57) ABSTRACT

There is provided a pigmented aqueous ink set including:

(a) A concentrated black ink having a pigment concentration up to 10% by weight; and (b) at least one dilute ink having a pigment concentration below that of the concentrated ink;

wherein all the inks additionally includes an aqueous carrier medium and at least one of the set of inks includes a combination of carbon black and Pigment Blue 60.

15 Claims, No Drawings

PIGMENTED AQUEOUS INKS AND INK SET FOR INK JET PRINTING

FIELD OF THE INVENTION

This invention relates to improved black pigmented ink jet inks, and in particular to a black ink jet ink and an ink set showing an improved tonal appearance.

BACKGROUND OF THE INVENTION

Ink jet printing is a non-impact method that in response to a digital signal produces droplets of ink that are deposited on a substrate such as paper or transparent film. Ink jet printers have found broad application as output for personal computers in the office and the home. There are several classes of ink jet printer, for instance thermal drop-on-demand printers, piezo drop-on-demand printers, and continuous ink jet printers.

Ink jet printers generally use aqueous inks, and such inks commonly employ dyes as colorants. Several suitable water soluble dyes which have been perfected for ink jet use are known, but there are some deficiencies to the use of these dyes. For instance they remain soluble in water on the printed page and are therefore subject to print defects such as feathering and to leaching by water, for example rain water and coffee. Furthermore, many of the dyes in use have poor light fastness and fade even on exposure to fluorescent lighting used in offices. There is particular difficulty in finding a good black dye to fulfill all these requirements and also provide a neutral black appearance. It is especially noticeable when printing monochrome, or so called black and white images, that gray areas of the image can appear somewhat blue, violet, or brown in shade rather than neutral. A blue shaded image is described as cold toned, and a brown shaded image as warm toned. Although under certain circumstances toned images may be desired, a neutral or nearly neutral shade is normally preferred, and it has become common to use a mixture of black dyes such as those disclosed in PCT WO 00/46309 partly in an attempt to provide the neutral appearance.

However the other difficulties remain, and consequently it is becoming increasingly common to use a black pigment such as carbon black in ink jet inks. The term pigment describes a colorant which is substantially insoluble in the aqueous ink medium. It is expected that prints produced using pigmented inks will display improved fastness to washing and weathering and better light stability. In addition carbon black shows a more neutral tone than dye based black inks.

There is interest in using ink jet prints as a replacement for conventional photographic monochrome, or black and white images. Monochrome prints cannot be produced to a high quality on a standard four color ink jet printer. The alternatives for monochrome printing on a standard four color printer are either to print a monochrome image using all four colors, or to print with the black ink only. Printing with colored inks can result in an overall color cast to the image, and in addition the individual colored dots become visible in the light areas of the print. The alternative, printing with the black ink only, produces grainy prints because effectively the dot resolution of a 600 dpi (dots per inch) printer is reduced to 150 dpi, and this is most noticeable in the light areas of the print.

It is known that the use of more than one black ink (commonly four) of different dilutions (i.e. gray inks) can address these problems. For example it is known to use a conventional black ink in the "black" channel of the printer, and somewhat dilute black inks to feed the three color channels, with the most dilute ink being in the "yellow" channel. Such inks may be printed without modification of the control software to produce a monochrome image. The use of all four ink cartridges allows full use of the dot resolution of the printer, but the image still suffers defects, for example that individual dots are visible in low density areas. Furthermore the overall image quality does not equal that of conventional photographic prints.

A better solution is to modify the controlling software and use four inks of increasing dilution. Such a system is commercially available under the trade name ILFORD Archiva MonoKrome Ink. By correct choice of the strength of each of the four inks and the design of the software a high quality image may be produced. Furthermore, the visibility of the dots in the light areas of the print can be reduced by printing such areas with light gray inks, thus increasing the number of dots printed for a given density and reducing the visual impact of any given dot, and the black density may be increased by overprinting one ink with another. One limitation of this approach however is that the image tone is dictated by the color of the inks, and in particular that the lightest, or most dilute inks tend to provide brown, or warm toned images even though carbon black is used as pigment. This effect is the factor which limits the degree of dilution of the most dilute ink. On the other hand, it is generally desirable to increase the dilution of this ink to improve the image quality.

The use of a combination of carbon black with a dye in a black aqueous ink jet ink is known according to European Patent Applications 0 724 968 A, 0 913 438 A, and 1 002 839 A. The use of a combination of carbon black with cyan and magenta pigments is known according to U.S. Pat. No. 5,803,958. However these inks are not described for improving the tone of black and white images. We have found a particular combination of pigments which is useful for providing monochrome images from aqueous ink jet inks.

SUMMARY OF THE INVENTION

In the present invention, these purposes, as well as others which will be apparent, are achieved generally by providing a pigmented aqueous ink set which comprises a black ink and at least one dilute ink, wherein at least one of the inks comprises carbon black and Pigment Blue 60. The ratio of black pigment to blue pigment may be between 10:1 and 1:2 and depends on the particular grade of the pigments, the ink formulation, the printing medium and the desired final tone.

Other objects, features, and advantages of the present invention will become apparent from the following detailed description of the invention.

DETAILED DESCRIPTION OF THE INVENTION

According to the invention there is provided a pigmented aqueous ink set comprising:

(a) A concentrated black ink having a pigment concentration of up to 10% by weight; and (b) at least one dilute ink (preferably a gray ink) having a pigment concentration below that of the concentrated ink; wherein all the inks additionally comprise an aqueous carrier medium and at least one of the set of inks comprises a combination of carbon black and Pigment Blue 60.

Carbon black is listed in the Pigments and Solvent Dyes section of the Colour Index International, published by the Society of Dyers and Colourists in 1997 as C. I. Pigment Black 7. Examples include furnace black, lamp black, acetylene black, and channel black. It is also possible to use a processed pigment such as self dispersing carbon black or graft carbon black having a surface treated with a resin or the like. Preferably the pigment concentration in the black ink is between about 3% and about 5%.

C. I. Pigment Blue 60 is an indanthrone of the following structure.

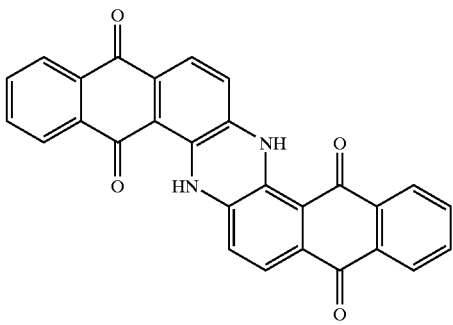

Optionally and preferably each ink may also comprise at least one dispersant for the pigments. The purpose of the dispersant is to stabilize the particles and prevent flocculation, aggregation, and settling of the ink. Suitable dispersants for pigmented ink jet inks are well known in the art, and include polymeric dispersants as well as some non-polymeric compounds of the surfactant type. Suitable dispersants for this invention include macromolecular polyionic dispersants, for example copolymers of styrene with acrylic, methacrylic, or maleic acids; various types of poly(ethylene oxide) condensates such as alkyl polyethylene oxide ethers and sulfate or phosphate esters thereof; and surfactants such as sarcosinate compounds. The ink may contain up to 400% of the dispersant by weight on the pigment, but preferably between about 10% and about 100% by weight on the pigment, and most preferably approximately 20 to 50% by weight on the pigment, depending on the pigment used and other properties desired of the ink.

A preferred dispersant for the inks of this invention is a copolymer of styrene with acrylic or methacrylic acids, together with optionally additional vinylically unsaturated comonomers such as acrylate esters. Preferably this dispersant is characterized by an acid number of between about 150 and about 250, a glass transition temperature between about 70° and about 100°, and a molecular weight of between about 2000 and about 20000, and most preferably the acid number is between 150 and 200 and the molecular weight is approximately 5000–15000. Many suitable styrene acrylate dispersants are commercially available. Such styrene acrylate copolymer dispersants may be supplied commercially in the form of concentrated solutions in aqueous base, or as solids which are to be dissolved in water in the presence of a base. Suitable bases for dissolving such dispersants include sodium or potassium hydroxide, ammonia, or an organic amine base such as ethanolamine, triethanolamine, 2-amino-2-methyl-1-propanol, or 1-(dimethylamino)-2-propanol. It is also possible to use mixtures of such bases to dissolve the styrene acrylate copolymer.

The pigment may be used in the form of a dry powder. However pigments are often supplied commercially as a concentrated aqueous pigment dispersion, and this invention is also useful for pigments supplied as such dispersions, which commonly include dispersants and other cosolvents as well as water. Alternatively the pigment may be supplied in the form of a water wet presscake. In presscake form, the pigment is not aggregated to the extent that it is in dry form and thus the pigment does not require as much deaggregation in the process of preparing the inks from dry pigments.

The ink may contain up to approximately 10% of each pigment by weight. The ratio of the black pigment to the blue pigment may be between 10:1 and 1:2, preferably between approximately 2:1 and approximately 1:1, by weight. The ratio depends on the particular grade of the black and blue pigment, the ink formulation, the printing medium, and the desired final tone. The ratio may vary with the concentration of the pigments in the ink. In addition to providing neutral toned prints, controlled warm or cold toned prints may be produced by appropriately changing the pigment ratio.

By an aqueous carrier medium is meant a medium which is water or is predominantly water. It is common in aqueous ink jet inks to employ a carrier medium which is a mixture of water and at least one relatively involatile water soluble organic cosolvent. The purpose of the cosolvent is to act as humectant and prevent drying out of the ink in the nozzles of the printer, to improve printing performance, and also to improve the appearance of the final image. Deionised water is commonly used.

Preferably each ink comprises a mixture of water and at least one water soluble organic cosolvent. The water soluble organic cosolvent may be any organic solvent which has sufficient solubility in water. Representative examples of water-soluble organic solvents that may be selected include:

(1) alcohols, such as methyl alcohol, ethyl alcohol, n-propyl alcohol, isopropyl alcohol, n-butyl alcohol, sec-butyl alcohol, t-butyl alcohol, iso-butyl alcohol, neopentyl alcohol, benzyl alcohol, furfuryl alcohol, and tetrahydrofurfuryl alcohol;

(2) ketones or ketoalcohols such as acetone, methyl ethyl ketone and diacetone alcohol;

(3) ethers, such as tetrahydrofuran and dioxane;

(4) esters, such as ethyl lactate;

(5) polyhydric alcohols, such as ethylene glycol, diethylene glycol, triethylene glycol, tetraethylene glycol, polyethylene glycol, propylene glycol, dipropylene glycol, diacetone alcohol, trimethylolpropane, 2-methyl-2,4-pentanediol, 2,3,4-trimethyl-1,3-pentanediol, 1,3-propanediol, 1,5-pentanediol, glycerol, 1,2-hexanediol, and 1,2,6-hexanetriol;

(6) lower alkyl mono- or di-ethers derived from alkylene glycols, such as ethylene glycol monomethyl (or -ethyl) ether, diethylene glycol mono-methyl (or -ethyl) ether, propylene glycol mono-methyl (or -ethyl) ether, triethylene glycol mono-methyl (or -ethyl) ether and diethylene glycol di-methyl (or -ethyl) ether;

(7) sulfur-containing compounds such as tetramethylene sulfone, dimethyl sulfoxide, and thiodiglycol; and (8) nitrogen containing organic compounds such as 1,3-dimethyl imidazolidinone, urea, pyrrolidone and N-methyl-2-pyrrolidone.

Selection of a suitable mixture of water and water soluble organic cosolvent depends on the requirements of the specific application, such as the desired surface tension and viscosity, the selected pigment, the drying time of the pigmented ink jet ink, and the type of substrate onto which the ink will be printed. A mixture of water and at least one water soluble organic solvent having at least 2 hydroxyl groups is preferred. Therefore preferred organic cosolvents include for example diethylene glycol, triethylene glycol, polyethylene glycol, thiodiglycol, glycerol, 1,2-hexanediol, 1,5-pentanediol, and mixtures comprising these solvents. The aqueous ink composition may contain up to 50% of the organic cosolvent or mixture of organic cosolvents. Preferably the ink comprises up to 10% of each organic cosolvent, and most preferably between about 5% and about 10% of each of a mixture of at least two organic cosolvents.

The pigmented inks of the invention may also comprise other components which are advantageously added to aqueous ink jet inks, such as surfactants, viscosity modifiers, and biocides. In addition, sequestering agents such as EDTA may also be included to eliminate deleterious effects of heavy metal impurities.

It is generally desirable to prepare a concentrated dispersion by dispersing the pigment in water in the presence of one or more dispersants, and then to dilute this dispersion with additional water together with the organic solvent or solvents together with any other additives to form the ink. This technique permits preparation of a greater quantity of pigmented ink from the equipment. By dilution, the ink is adjusted to provide the desired concentration, color strength, and other properties for the particular application. The surface tension is preferably in the range from about 30 dyne/cm to about 50 dyne/cm and the viscosity is generally no greater than 20 cP, and preferably in the range from about 1 cP to about 10 cP. Alternatively the cosolvent and any other additives may be present during the dispersion stage. The inks of the invention may either be prepared by dispersing the pigments separately to produce two separate dispersions and then combining them at dilution, or by dispersing a combination of the pigments.

The dispersing step may be accomplished by many well known methods, for example in a horizontal mini mill, a ball mill, a roll mill, an attritor, a homogeniser or by passing the mixture through a plurality of nozzles within a liquid jet interaction chamber at a liquid pressure of at least 1000 psi to produce a uniform dispersion of the pigment particles in the aqueous carrier medium.

The particle size of the pigment is preferably 10 μm or less, particularly preferably 1 μm or less and most preferably from 0.005 to 0.3 μm.

According to one particularly preferred embodiment of the invention there is provided a pigmented aqueous ink set of four inks comprising:

(a) A concentrated ink having a pigment concentration between about 3% and 5% by weight;

(b) a dilute ink having a pigment concentration between about 1% and about 4% by weight;

(c) a more dilute ink having a pigment concentration between about 0.5% and about 3% by weight; and (d) a most dilute ink having a pigment concentration between about 0.1% and about 1% by weight;

wherein all the inks additionally comprise an aqueous carrier medium as herein before defined and at least one of the inks comprises a combination of carbon black and Pigment Blue 60.

It is to be understood that the preferred pigment concentration of each of the inks depends on the controlling software as well as the printer to be used, the type of substrate onto which the ink will be printed, and the desired visual result. However in general the preferred pigment concentration of the black ink (a) is approximately 3.5%, that of the second ink (b) is between 1% and 3%, that of the third ink (c) between 0.5% and 2%, and that of the most dilute ink (d) between 0.1% and 0.8%. Most preferably the three dilute inks all comprise the combination of carbon black and Pigment Blue 60. The weight ratio between the carbon black and Pigment Blue 60 may be different in the different inks of the ink set. For certain uses it is preferable that the proportion of blue pigment will be greater in the ink or inks of lowest concentration.

The inks of the pigmented ink set of this aspect of the invention may advantageously also comprise other components as herein before defined such as a dispersant. An additional colorant may also be present, but one of the advantages of the ink set of the invention is that a good image tone is provided using simple combinations of just two pigments.

The ink set of this aspect of the invention produces pleasing high quality images of good image tone and high maximum density but showing minimum dot visibility in the highlight areas of the print. A further advantage of the inks of the present invention is that the prints exhibit excellent lightfastness.

In another embodiment of the present invention, there is provided a process of printing using the ink and ink set of the invention. The printing is effected by using the ink set in an ink jet printer, and applying the ink to a printing medium which can be any of the substrates commonly used for ink-jet printing, for example so-called plain paper, coated paper, wet strength paper, fine art paper, canvas, self-adhesive vinyl, scrim vinyl, overhead transparencies, fabrics, and synthetic media such as white polyester and bonded nonwoven polyolefin film-fibril sheets such as polyethylene or polypropylene banner materials.

The inks and ink set of this invention may be used with a variety of ink jet printers such as continuous, piezoelectric drop-on-demand and thermal or bubble jet drop-on-demand, and are particularly adapted for use in piezoelectric and thermal drop on demand printers. The printer may be a desk top printer or a wide format ink jet printer.

The stability of the ink formulation also allows long storage periods without any loss of printability.

The following examples will serve to illustrate the invention. These examples are merely representative and are not inclusive of all the possible embodiments of the invention.

EXAMPLE 1

A comparative ink set was prepared as follows:
Preparation of Black Pigment Dispersion A black pigment dispersion according to the composition shown in Table 1 was prepared using a Microfluidiser Model M210C at 30,0000 psi. The dispersion was then centrifuged to remove oversized particles. A commercial sample of Carbon Black pigment was used available from Degussa-Hüls under the trade name Black S170. The dispersant used was a commercially available styrene acrylate copolymer having an acid number of 190, a Tg of 70° and a molecular weight of 2000 to 6000 neutralised with potassium hydroxide. This dispersant is available from BF Goodrich.

TABLE 1

| Component | % by weight |
|---|---|
| Carbon Black Pigment | 10 |
| Dispersant | 2.5 |
| Deionised Water to make | 100 |

The average particle size of the dispersion was less than 200 nm.
Preparation of Inks Three black inks with decreasing concentration were prepared from the black dispersion by dilution according to the formulations shown in Table 2.

TABLE 2

|              | Amount Parts by Weight | | |
| Component    | Ink 1 | Ink 2 | Ink 3 |
| --- | --- | --- | --- |
| Black Pigment Dispersion | 15 | 8.5 | 5.0 |
| Thiodiglycol | 10 | 10 | 10 |
| Urea | 5 | 5 | 5 |
| Polyethylene Glycol MW300 | 5 | 5 | 5 |
| Diethanolamine | 0.4 | 0.4 | 0.4 |
| Deionised Water to make | 100 | 100 | 100 |

An ink set according to the invention was prepared as follows:

Preparation of Blue Pigment Dispersion

A blue pigment dispersion according to the composition shown in Table 3 was prepared using a Microfluidiser Model M110 at 12000 psi. A commercial sample of Pigment Blue 60 from Dainippon Ink and Chemicals under the trade name Fastogen Super Blue 6070S was used. The dispersant used was a commercially available styrene acrylate copolymer having an acid number of 215, a Tg of 95° and a molecular weight of 8500 neutralised with potassium hydroxide. This dispersant is available from SC Johnson Polymers. The dispersion was then centrifuged at 3000 rpm for 20 minutes to remove oversized particles.

TABLE 3

| Component | % by weight |
| --- | --- |
| Pigment Blue 60 | 7.14 |
| Dispersant | 3.57 |
| Deionised Water to make | 100 |

Preparation of Inks

Three inventive black inks were prepared by adding this blue pigment dispersion to the black inks 1–3 according to the formulations shown in Table 4.

TABLE 4

|              | Amount Parts by Weight | | |
| Component    | Ink 4 | Ink 5 | Ink 6 |
| --- | --- | --- | --- |
| Black ink 1 | 50 | | |
| Black ink 2 | | 50 | |
| Black Ink 3 | | | 50 |
| Blue Pigment Dispersion | 6.2 | 3.5 | 2.1 |
| Total | 56.2 | 53.5 | 52.1 |
| Total Pigment Concentration | 2.39% | 1.35% | 0.8% |
| Ratio black:blue pigment | 1.7:1 | 1.7:1 | 1.67:1 |

Colorimetry

The comparative and inventive ink sets were loaded into an Encad Novajet 700i Inkjet printer. Test charts including 100% density patches were printed on ILFORD IJP1GP7 media. All inks printed successfully and produced excellent image quality. The Density and CIELAB L* a* b* colorimetry values of the 100% density patches of the prints were measured with a Gretag Specrolino reflectance calorimeter using D65 illuminant and 2° Standard Observer. The results are shown in Table 5.

TABLE 5

|              |       | CIELAB colorimetry values | | |
|              |       | L* | a* | b* |
| --- | --- | --- | --- | --- |
| Inkset 1 (Comparative) | Ink 1 | 20.91 | 0.77 | 0.42 |
|  | Ink 2 | 32.82 | 1.85 | 6.17 |
|  | Ink 3 | 45.7 | 1.72 | 6.79 |
| Inkset 2 (Inventive) | Ink 4 | 32.13 | −0.11 | −0.55 |
|  | Ink 5 | 36.5 | −0.37 | 0.84 |
|  | Ink 6 | 51.59 | −0.23 | 1.35 |

Under the L* a* b* colorimetry system the a* value is a measure of the color along the green/red axis, with a negative value being greener, and the b* value is a measure of the color along the blue/yellow axis, i.e. warm or cold toned, with a negative value being bluer or cold toned. A neutral tone has both a* and b* zero. It is seen that the two more dilute comparison inks 2 and 3 show a very strong and unpleasant brown or warm tone, with the b* value significantly removed from neutrality and also quite a positive a* value, whereas the inks from the inventive ink set display a nearly neutral tone. The b* and a* values of the inventive inks are sufficiently close to zero that the prints appear visually neutral.

Print Test

A comparison ink set comprising four inks of different dilution was made up comprising a black ink having a concentration of 3.5% carbon black and no blue pigment together with the comparison inks 1, 2, and 3 prepared above. An inventive ink set was also made up comprising the same black ink and the inventive inks 4, 5, and 6. A monochrome image was printed on ILFORD matt bond paper UMBP6 with each set using an ILFORD MonoKrome system. A high quality image of good gradation was produced by both ink sets, but that from the comparison inks was visually warm toned and that of the inventive set was visually neutral.

Finally, variations from the examples given herein are possible in view of the above disclosure. Therefore, although the invention has been described with reference to certain preferred embodiments, it will be appreciated that other inks may be devised, which are nevertheless within the scope and spirit of the invention as defined in the claims appended hereto.

The foregoing description of various and preferred embodiments of the present invention has been provided for purpose of illustration only, and it is understood that the numerous modifications, variations and alterations may be made without departing from the scope and spirit of the invention as defined in the appended claims hereto.

What is claimed is:

1. A pigmented aqueous ink set comprising:
   (a) a concentrated black ink having a pigment concentration of up to 10% by weight; and
   (b) at least one dilute ink having a pigment concentration below that of the concentrated ink; wherein all the inks additionally comprise an aqueous carrier medium and at least one of the set of inks comprises carbon black and Pigment Blue 60.

2. The ink set according to claim 1 wherein said aqueous carrier medium comprises water and at least one water soluble organic cosolvent.

3. The ink set according to claim 2 wherein said organic cosolvent is selected from diethylene glycol, polyethylene glycol, thiodiglycol, glycerol, urea, pyrrolidone, and combinations thereof.

4. The ink set according to claim 1 which additionally comprises at least one dispersant.

5. The ink set according to claim 4 wherein the dispersant is a styrene/acrylate copolymer.

6. The ink set according to claim 1 wherein the ratio of carbon black to Pigment Blue 60 is between 10:1 and 1:2.

7. The ink set according to claim 1 wherein the average size of said pigments are 10 μm or less.

8. A pigmented aqueous ink set comprising:
   (a) a concentrated ink having a pigment concentration between 3% and 5% by weight;
   (b) a dilute ink having a pigment concentration between 1% and 4% by weight;
   (c) a more dilute ink having a pigment concentration between 0.5% and 3% by weight; and
   (d) a most dilute ink having a pigment concentration between 0.1% and 1% by weight; wherein all the inks additionally comprise an aqueous carrier medium and at least one of the inks comprises carbon black and Pigment Blue 60.

9. The ink set according to claim 8 wherein said aqueous carrier medium comprises water and at least one water soluble organic cosolvent.

10. The ink set according to claim 8 wherein said organic cosolvent is selected from diethylene glycol, polyethylene glycol, thiodiglycol, glycerol, urea, pyrrolidone, and combinations thereof.

11. The ink set according to claim 8 which additionally comprises at least one dispersant.

12. The ink set according to claim 11 wherein the dispersant is a styrene/acrylate copolymer.

13. The ink set according to claim 8 wherein the ratio of carbon black to Pigment Blue 60 is between 10:1 and 1:2.

14. The ink set according to claim 8 wherein the average size of said pigments are 10 μm or less.

15. A process for printing which comprises using the ink jet ink set of claim 1 or 8 in an inkjet printer, and applying the ink to a printing medium with the ink jet printer.

* * * * *